Figure 1:
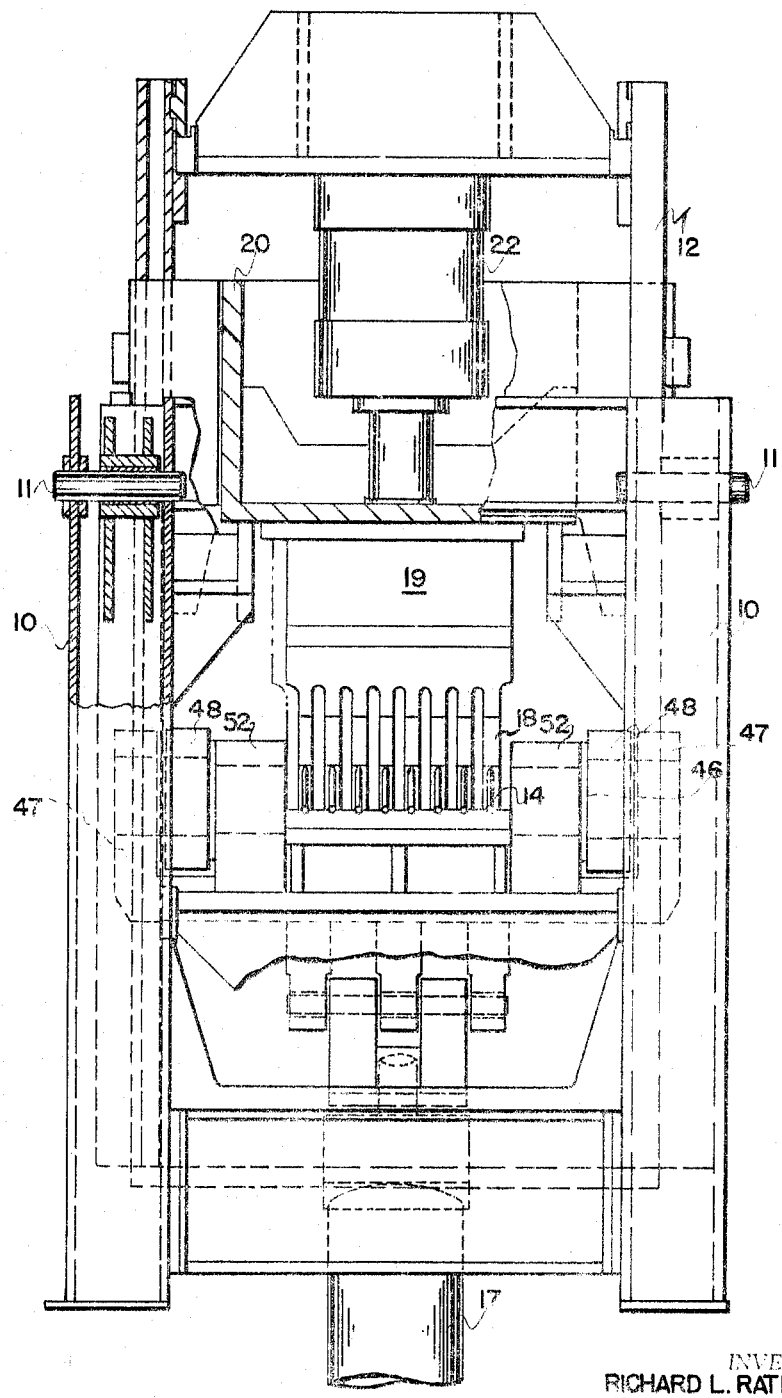

INVENTORS
RICHARD L. RATH
CLYDE I. PELTON
BY
Francis J. Klempay
ATTORNEY

April 19, 1966 R. L. RATH ETAL 3,246,499
APPARATUS FOR MAKING JOIST WEBS AND THE LIKE
Filed July 2, 1962 4 Sheets-Sheet 2

INVENTORS
RICHARD L. RATH
CLYDE I. PELTON
BY
Francis J. Klempay
ATTORNEY

April 19, 1966   R. L. RATH ETAL   3,246,499
APPARATUS FOR MAKING JOIST WEBS AND THE LIKE
Filed July 2, 1962   4 Sheets-Sheet 3

INVENTORS
RICHARD L. RATH
CLYDE I. PELTON
BY
Francis J. Klempay
ATTORNEY

April 19, 1966     R. L. RATH ETAL     3,246,499

APPARATUS FOR MAKING JOIST WEBS AND THE LIKE

Filed July 2, 1962     4 Sheets-Sheet 4

INVENTOR.
RICHARD L. RATH
CLYDE I. PELTON
BY
Francis J. Klempay
ATTORNEY

United States Patent Office 3,246,499
Patented Apr. 19, 1966

3,246,499
APPARATUS FOR MAKING JOIST WEBS
AND THE LIKE
Richard L. Rath and Clyde I. Pelton, Warren, Ohio, assignors to The Taylor-Winfield Corporation, Warren, Ohio, a corporation of Ohio
Filed July 2, 1962, Ser. No. 206,844
12 Claims. (Cl. 72—297)

This invention relates to the metal bending art, and more particularly to an improved method and apparatus for making repetitive bends in elongated metal sections such as round rods, for example. Such products are widely used in the manufacture of steel joists for the building trade wherein the product is utilized to form an open web between the top and bottom chord of the joist. These joists are made in large quantities and in a wide variety of depths and lengths by automatic equipment. It is therefore desirable to provide apparatus capable of making these webs at a high rate of production, at low cost, and with sufficient accuracy for use in high speed assembly equipment—particularly welders wherein the surfaces to be welded together must bear a predetermined relation to each other before application of the welding current.

It is accordingly the primary object of this invention to provide entirely practical methods and apparatus to rapidly and accurately bend common hot-rolled bars into zigzag shape suitable for use as the open webs of steel joists having top and bottom chords to which the webs are welded. A further important object of the invention is the provision of a bending method wherein the metal is so worked in the process of forming that the resultant product is stabilized as to shape and dimension regardless of varying degrees of springiness in the raw stock. This is accomplished primarily in accordance with the present invention, by forming the bends while the stock rods are under tension. Thus, a stretch-bend process is used in the forming of the webs.

A further object of the invention is the provision of improved apparatus for carrying out the bending method above generally outlined wherein the apparatus is rugged, compact, capable of a high rate of production, and readily adaptable for making webs of different depths, degrees of bend, and of different longitudinal distances between the welding nodes of the product.

The above and other objects and advantages of the invention will become apparent upon consideration of the following specification and the accompanying drawing wherein there is disclosed a preferred embodiment of the invention.

Figure 2A:
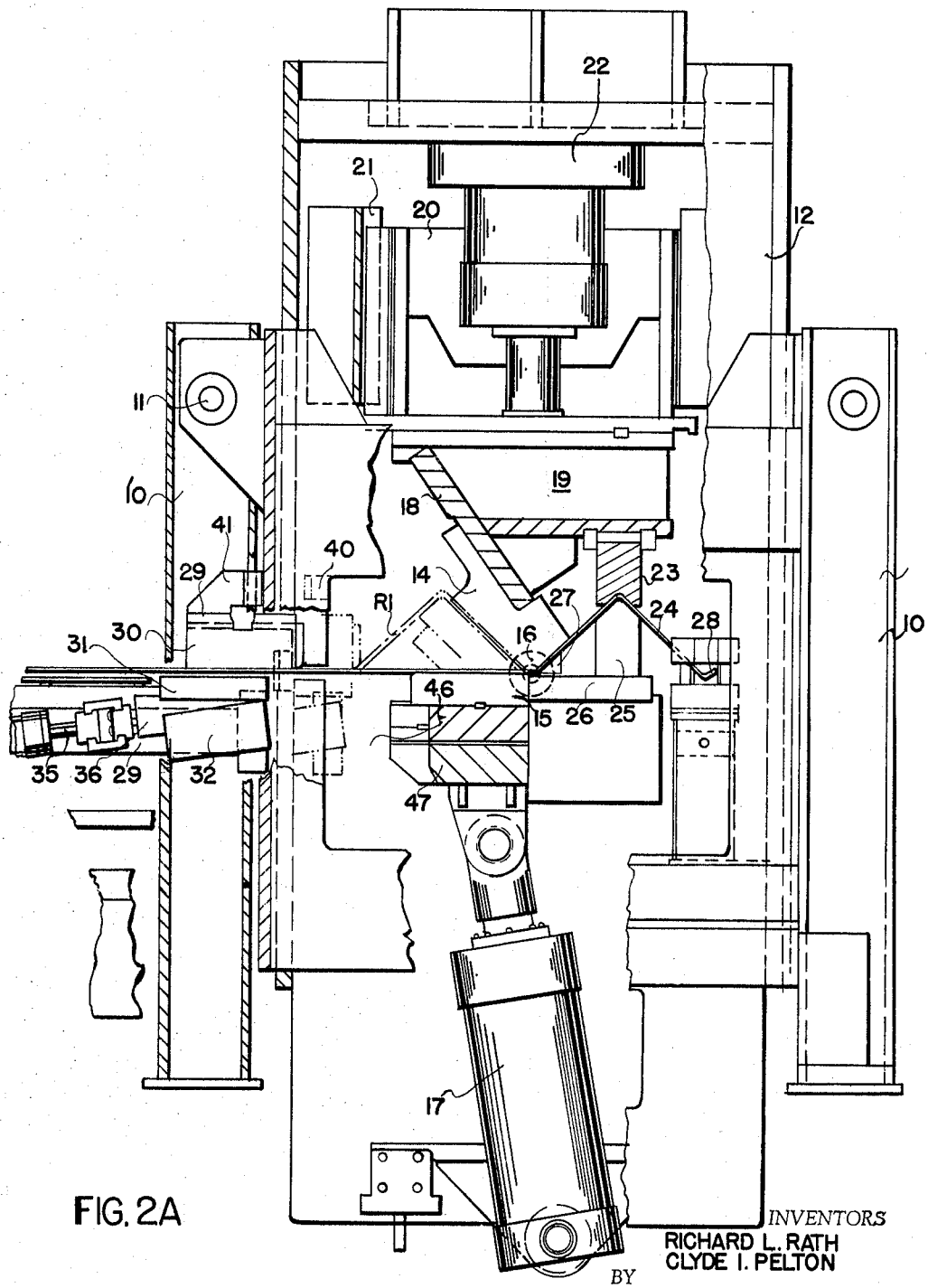
Figure 3:
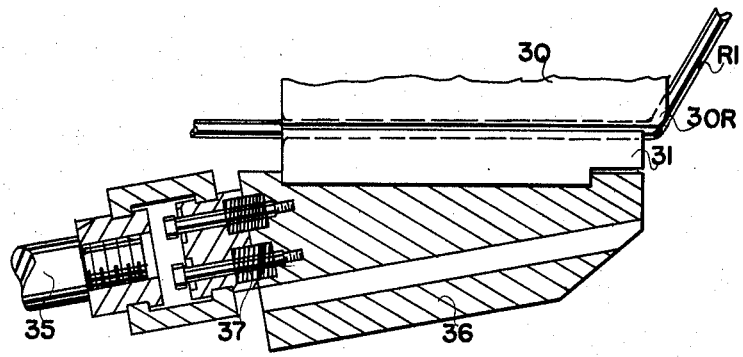
Figure 2B:
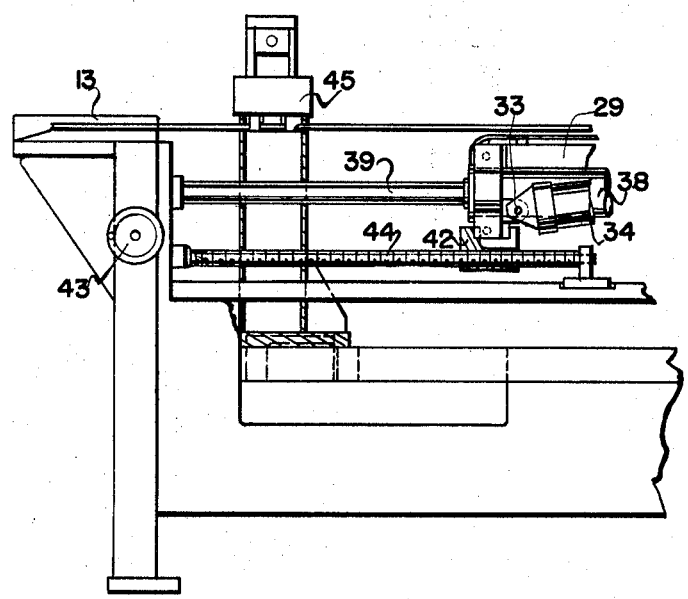
Figure 4:
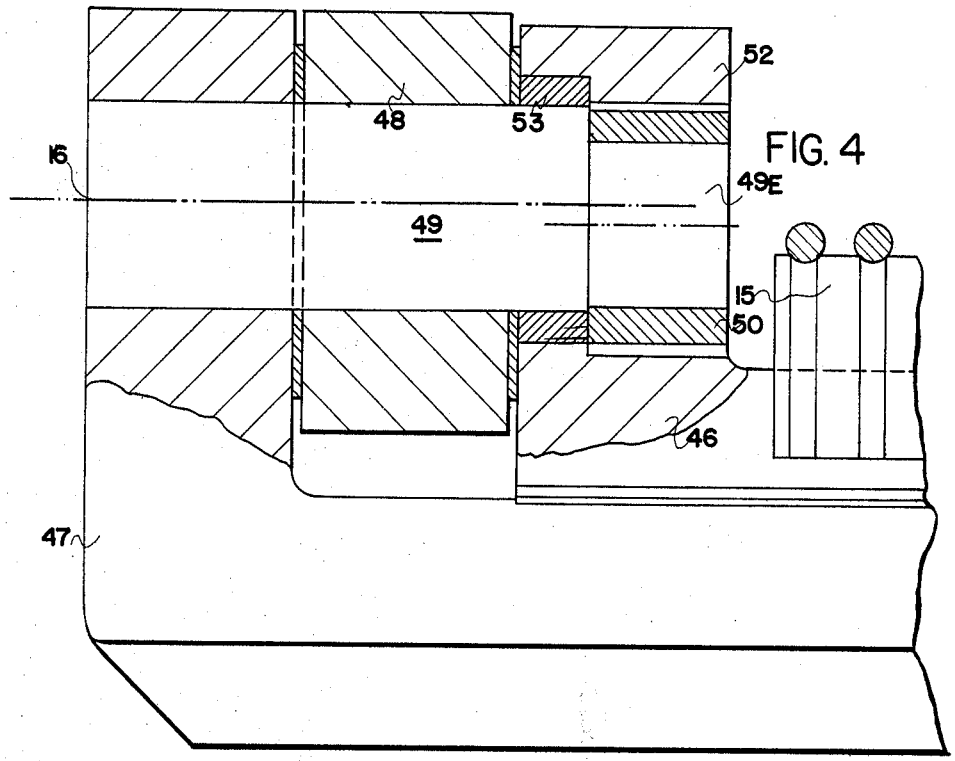
Figure 5:
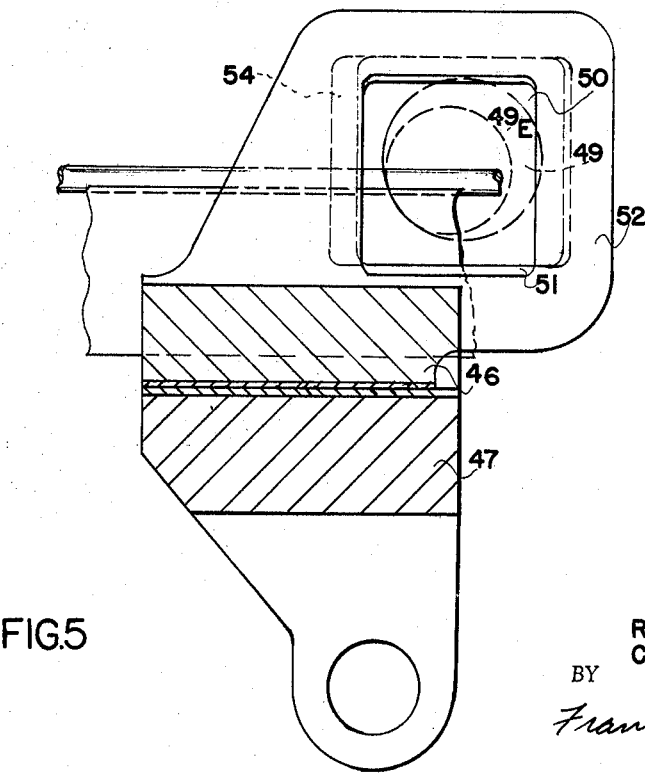

In the drawing:

FIGURE 1 is a front elevation, partly in section, of a web bending machine constructed in accordance with the principles and methods of our invention;

FIGURES 2A and 2B, taken together, are a side elevation partly in section of the machine of FIGURE 1;

FIGURE 3 is a detailed view of a clamp utilized in the assembly of FIGURE 1; and FIGURES 4 and 5 are further detailed views of a portion of the apparatus of FIGURE 1.

In the drawing, reference numeral 10 designates a main supporting or outer frame which carries substantially all of the operative components of the machine. Frame 10 has four quadrilaterally spaced columns, as shown, in the upper of each is secured a horizontally disposed pin 11. These pins have coincident and/or parallel axes, and supported on these pins is an inner frame or housing 12 which is so formed and provided with sufficient clearance to allow the inner frame 12 to have limited horizontal and transverse sliding movement with respect to the main outer and fixed frame 10.

Before further describing the illustrated machine in detail, it may be well to note that this machine is designed to effect simultaneous bends in a plurality (eight) of rods which are fed into the machine in side-by-side spaced relation from a feed table 13 (FIG. 2B) which has suitable guiding grooves therein. After the bends are made, as indicated in FIGURE 2A, the bending equipment opens up for clearance in the manner to be hereinafter described and the rods are advanced a proper distance preparatory to making the next bend. It will be appreciated that the bent webs will have appreciable height, and in actual practice a suitable runout guide is provided upon the bending machine to hold the webs in vertical spaced parallel relation until their bending is complete.

The bends are effected primarily by a series of anvil dies 14 and a wing die 15 which swings about the pivot point 16 under the power of a large cylinder 17. The dies 14 are slab-like pieces mounted in spaced parallel vertical relation on the tines 18 of a die carrying block 19. This block 19 is carried by the lower end of a vertical slide 20 which is mounted in ways 21 formed in the housing 12. A cylinder 22 is provided to raise and lower the block 19. Also mounted on the block 19 is a coining die 23 which may extend continuously in a transverse direction since when it is retracted by the cylinder 22 it is above the nodes of the bent webs 24. The dies 14 each have a semi circular groove extending about its working periphery to partially receive and retain the rod being bent, and a plurality of grooves for the same purpose is formed in the coining die 23.

Coacting with the coining die 23 is a plurality (eight) of coining anvil dies 25 which are again slab-like in shape and vertically disposed in spaced parallel relation on a carrier 26 which, in turn, is mounted on the inner shiftable frame 12 of the assembled machine. The slots between the tines 18 of the die block 19 lie in the same longitudinal planes as do the slots provided between the die segments 25. These various slots are, of course, vertical as evident in FIGURE 1 and are each of a width somewhat greater than the diameter of the rod stock being bent. It should therefore be apparent that with the wing die 15 retracted to the full line position shown in FIGURE 2A and with the die block 19 retracted a short distance by the cylinder 22, a slight transverse shifting movement of the inner frame 12 will align the various webs being worked on with the slots between the dies 14 and the slots between the dies 25, and thereby permit the webs to be advanced longitudinally preparatory to the next bending cycle. In the illustrated embodiment of the apparatus the webs being bent are rather shallow, but it should be appreciated that if it were not for the slots referred to the dies 14 and 23 would have to be retracted a very substantial distance when deep webs are being bent. It would also be necessary to retract the anvil die or dies 25, and both of these requirements would result in a much more complicated and expensive machine and in a much lower rate of production.

Also mounted on the carrier 26 is a plurality (eight) of die blocks 27 spaced and aligned similarly to the anvil dies 25. The dies 27 have a dual purpose—first, the webs are commonly formed with small bent up end portions 28 which are formed by the first downward stroke of the die carrier 19 and, secondly, to assist in clamping subsequent reaches of the webs intermediate the lower nodes of the dies 14 and the coining die assembly 23, 25 in subsequent bending cycles. As stated originally above and as will appear more fully below the bending of the webs is accomplished while the rod stock is under tension. The means to effect this tension will now be described.

At the entry end of the machine there is provided a longitudinally guided slide 29 which mounts an upper clamp plate 30, a lower movable clamp plate 31, and an inclined backup bar 32. Also mounted on the slide 29 at 33 (FIG. 2B) is a cylinder 34 having a rod 35 mounting a wedge 36 which is positioned between the backup bar 32 and the lower clamp plate 31. The clamp plates 30 and 31 have semi-circular grooves therein to receive the rod stock, and it should be apparent that upon energization of the cylinder 34 the clamp comprised of the plates 30 and 31 will tightly grip this rod stock. To provide for continuity of the gripping action even though pressure may momentarily drop in cylinder 34 we provide a spring biased lost motion connection 37 between the piston rod 35 and the wedge 36.

As will be apparent from FIGURE 2A as the wing die 15 moves upwardly to dotted line position the longitudinal distance between any particular two spaced points on the rod stock will become short. This requires that the gripping assembly 30, 31 must move inwardly during a bending cycle, and this is provided for by the side 29. To effect a suitable resistance to such inward movement and to thereby control the tension imparted in the rods the slide 29 has rigidly attached to it a cylinder 38 which slides on piston rod 39, the latter being fixed. During a bending cycle oil under controlled pressure is fed to the rod end of the cylinder 38 and in this manner the resistance to forward movement of the slide 29 and consequently the tension imparted in the rods is closely controlled. In addition to the maintenance of this tension during most of the bending cycle the rods are actually stretched along the reach R1 (FIG. 2A) during the last part of the upward movement of the die 15. It should be noted that the bends making the upper nodes are formed about the radius of the upper left corner of the die 15 while the bends making the lower nodes are partially formed by the radius 30R of the clamp plate or die 30. The stretching therefore extends into these bends and acts to stabilize the bends even when the work pieces are ejected from the machine. The amount of the stretching is determined by the setting of an adjustable stop 40 which is engaged by an abutment 41 rigidly mounted on the slide 29. It will therefore be understood that the inward limiting position of the die 30 will be varied for different products having different pitch lengths between nodes.

At the completion of a bending cycle—i.e. after the coining dies 23, 25 have been forcibly closed and the wing die 15 moved upwardly its full extent fluid is admitted to the rod end of cylinder 34 to release the grip 30, 31 thereby allowing the fluid pressure in the rod end of cylinder 38 to move the slide 29 outwardly an extent determined by the setting of adjustable stop 42. This gives a new bite on the stock at a point to provide the proper stretch in the next bend to be made. The position of stop 42 is controlled by a hand wheel 43 acting through suitable bevel gears, not shown, and a threaded engagement with the sliding stop 42. Prior to this retraction of the slide 29, however, it should be understood that the die block 19 is first retracted, the housing 12 shifted to align the slots referred to above with the webs being formed and a feeding grip 45 actuated to advance the webs being formed through a distance equal to their pitch dimension—i.e. the interval between their upper nodes, for example. Suitable means, not shown, is provided to reciprocate the feeding clamp 45 through the desired stroke and in proper sequence with respect to the operation of other parts of the complete machine.

We may, if desired, provide a separate grip plate 31 and associated wedge 36 and cylinder 34 for each of the rods to be bent so that the rods will be individually gripped and back tension applied in equal measure to each of the rods. Likewise, this would insure that the same amount of stretch is applied to each of the rods of the group being processed. In the operation of the apparatus thus far described, it should be noted that after indexing movement by the feed clamp 45 and the subsequent reclosing of the dies 14 and 23 with respect to the dies 27 and 25 the stock will be straight up to the bottom rounded nose of the dies 14. This time the wing die 15 is in horizontal position as shown in FIGURE 2A. The die 15 does not slide on the stock but rather rolls around the rounded bottom noses of the dies 14 to complete the bending of the bottom nodes of the webs in an accurate manner and without reducing the cross-sectional area of any part of the stock. This is accomplished in the general manner shown and described in U.S. Patent 2,937,686 by allowing the die 15 to slip in a circumferential direction with respect to the axis 16 and with respect to the swinging wing which carries the die as the wing is forcibly swung upward. Thus, the die 15 is keyed on a slip plate 46 which slides on the swinging wing structure 47. The arrangement is shown more fully in FIGURES 1, 4 and 5 wherein the reference numeral 48 designates a pair of spaced blocks each rigidly mounting a pin 49. The blocks 48 are carried on the main frame 10 and the pins 49 are held against rotation therein. As shown in FIGURES 4 and 5, the wing structure 47 swings on the pins 49 and the inner end of each pin has an eccentric portion 49E which is received in bearing blocks 50 mounted in vertical slots 51 of the yoke 52 which are attached to or integral with the slip plate 46. A portion of the parent diameter of each pin 49 also extends into the yoke 52 for reception in a bearing block 53 slideably received in a horizontal slot 54 also formed in each yoke 52. This scotch yoke element holds the slip plate 46 down onto the wing 47 but still allows the slip plate to move back and forth on the wing as suggested by the double arrow in FIGURE 5 as the wing 47 is swung about the axis 16 of the pins 49 by cylinder 17. By properly designing the eccentric pin 49, 49E the slip plate 46 and consequently the bending die 15 may be caused to have rolling action on the stock being bent about the nodes of the dies 14. There is no slippage or mutilation and the stock accordingly retains its full strength at the bends.

Since the bends at the upper nodes of the webs are initially made by stretch bending about the radiused edge of the swinging die 15 these bends may lack some uniformity because of varying characteristics of the steel employed. Any variation, however, is corrected by the action of the coining dies 23, 25. Also, these latter dies assist in subsequently holding the pre-bent portions of the webs when subsequent bends are being made by upward swinging of the die 15. During such upward swinging of the die 15 all the stock pieces are, of course, held in the coining dies 23, 25 and by the clamp or clamps 30, 31. The latter are first yieldingly restrained and finally fully restrained against inward movement while the coining dies can have no longitudinal movement. Consequently, the webs are formed under conditions of stretch bending and the formed dimensions (as to pitch and web height) will be uniform even though the individual rods are of fairly variable cross-sectional size and area as is common in the case of hot rolled products.

It should now be apparent that we have provided an improved method and apparatus for accurately effecting repetitive and opposite bends in elongated bar or rod stock which accomplishes the objects initially set out. By a combination of tangent (rolling) and stretch bending of accurately and rigidly held stock the resultant formation is accurate, stable, and as a consequence the product is well suited for further assembly in automated equipment. Because a multiple number of rods or bars may be simultaneously processed the rate of production is high, and since the extent of movements of various components is kept low the machine can operate at high speeds and with a minimum of maintenance. Further, the arrangement of the operative parts of the machine is such that changeovers may be readily made to produce reversely bent elongated products of different depths and pitch dimension.

Since, as stated above, various changes may be made in the structure of our apparatus without departing from the spirit or scope of our invention, reference should be had to the appended claims in determining the scope of the invention.

We claim:

1. Apparatus for making a series of reverse bends in a metal rod comprising a first die having a peripheral working surface defined by a node and angularly related straight surfaces splayed outwardly from said node, a second die mounted for swinging movement substantially about the axis of said node and operative to bend the rod about said node and into contact with one of said straight surfaces, a gripper die positioned ahead of said swinging die and operative to grip a straight section of the rod ahead of said swinging die and restrain longitudinally movement thereof, said gripper die having a radius about which the rod is bent upon operative movement of said swinging die, said swinging die also having a radiused corner at its outer free end about which the rod is also bent, the arrangement being such that when said swinging die is retracted the rod is straight between said node and said gripper die but upon operative swinging movement of said swinging die the three bends herein defined are simultaneously made in the rod.

2. Apparatus according to claim 1 further including means to adjustably limit the inward movement of said gripper die to thereby effect a stretching in the rod in the final stage of the bending cycle.

3. Apparatus according to claim 1 further including means to adjust the degree of restraint to inward movement applied to said gripper die whereby the tension in the rod during the bending cycle may be adjusted.

4. Apparatus according to claim 1 further including means to shift said first die laterally of the rod to thereby permit, upon retraction of said swinging die, an indexing longitudinal movement of the rod preparatory to the next bending cycle.

5. Apparatus according to claim 1 further including a plurality of said first dies mounted on a retractable carrier in spaced parallel relation to each other, the spacings between said first dies defining longitudinally extending slots, said second die being of sufficient dimension to coact with all of said first dies simultaneously, said retractable carrier being shiftable laterally of the longitudinally axes of the rods being bent to thereby position said rods within said slots without lateral shifting of the rods, the arrangement being such that after said carrier is so shifted the rods may be advanced longitudinally through said slots.

6. Apparatus according to claim 1 further including a coining die positioned longitudinally beyond said first die and being operative, after longitudinal indexing movement of the rod to coin the bend which was previously made in the rod by the outer radiused corner of said swinging die.

7. Apparatus for making a series of reverse bends in a plurality of metal rods lying in spaced side-by-side relation and adapted to advance longitudinally through the apparatus in a step-by-step movement with a bending cycle taking place at each stop comprising in combination a main outer frame housing a swinging die having parallel grooves therein to engage the respective rods from below, a gripper die structure ahead of said swinging die having longitudinal sliding movement on said main frame and having spaced grooves to engage said rods from above and side grooves terminating at their ends adjacent said swinging die in upwardly radiused surfaces, anvil dies carried by said frame and positioned above said rods and having a rounded lower node about which said swinging die is adapted to generally rotate, said anvil dies having straight surfaces extending upwardly and outwardly of said nodes against which said swinging die is adapted to forcibly move sections of the rods, and the said grooves in said swinging die having downwardly radiused ends adjacent said gripper die structure, the arrangement being such that upon upward swinging movement of said swinging die said rods are bent about said nodes and said downwardly and upwardly radiused ends of said grooves.

8. Apparatus according to claim 7 further including means to resist the inward sliding movement of said gripper die structure to cause said rods to be bent under tension.

9. Apparatus according to claim 7 further including means to adjustably limit the inward movement of said gripper die structure to thereby effect a stretching in the rods in the final stage of the bending cycle.

10. Apparatus according to claim 7 further characterized in that said anvil dies are carried by a vertically retractable carrier operative when retracted to release said rods from said anvil dies and said swinging die.

11. Apparatus according to claim 10 further characterized in that said carrier is mounted on an inner frame having limited lateral sliding movement with respect to said outer frame and said gripper die structure, and said anvil dies being separated by longitudinally extending slots whereby during retraction of said carrier and with said inner frame being shifted to inoperative position with respect to said outer frame said rods previously bent by said swinging die may be advanced longitudinally through the apparatus.

12. Apparatus for making a series of reverse bends in a metal rod comprising an anvil die having a peripheral working surface defined by a node and angularly related straight surfaces splayed outwardly from said node, a swinging die mounted for swinging movement substantially about the axis of said node and extending only forwardly of said node and being operative to bend the rod about a portion of said node and into contact with one of the straight surfaces, a normally fixed die having a working surface extending generally parallel with the other of said straight surfaces of said anvil die outwardly from the other portion of said node, means to effect opening and closing movement between said fixed and swinging dies and said anvil die to thereby effect an initial partially bent end in the rod after which said swinging die may complete the bending of the rod about said node, and said swinging die having a radiused outer free edge about which a second and reverse bend may be made in said rod upon swinging movement of said swinging die.

References Cited by the Examiner

UNITED STATES PATENTS 1,791,620 2/1931 Hibbard _____ 153—20
1,867,581 7/1932 Marietta.
2,995,155 8/1961 Fisher.

FOREIGN PATENTS 212,962 1/1958 Australia.
565,797 11/1944 Great Britain.

CHARLES W. LANHAM, *Primary Examiner.*